US011883366B2

(12) United States Patent
Bijlsma

(10) Patent No.: US 11,883,366 B2
(45) Date of Patent: Jan. 30, 2024

(54) DISC FOR A MEDICINE UNIT DELIVERY DEVICE, MEDICINE UNIT DELIVERY DEVICE COMPRISING SUCH DISK, AND METHOD FOR CONFIGURING A MEDICINE UNIT DELIVERY DEVICE

(71) Applicant: DD Innovations B.V., Liempde (NL)

(72) Inventor: Dennis Raymond Bijlsma, Tuk (NL)

(73) Assignee: DD INNOVATIONS B.V., Liempde (NL)

( * ) Notice: Subject to any disclaimer, the term of this patent is extended or adjusted under 35 U.S.C. 154(b) by 0 days.

(21) Appl. No.: 17/844,263

(22) Filed: Jun. 20, 2022

(65) Prior Publication Data

US 2022/0401304 A1 Dec. 22, 2022

(30) Foreign Application Priority Data

Jun. 20, 2021 (NL) ...................................... 2028489

(51) Int. Cl.
*A61J 7/00* (2006.01)

(52) U.S. Cl.
CPC .................................. *A61J 7/0076* (2013.01)

(58) Field of Classification Search
CPC .................................................... A61J 7/0076
See application file for complete search history.

(56) References Cited

U.S. PATENT DOCUMENTS

| | | | | |
|---|---|---|---|---|
| 6,039,208 | A * | 3/2000 | Lambelet, Jr. | B65D 83/0463 221/75 |
| 6,824,006 | B2 * | 11/2004 | Lambelet, Jr. | B65D 50/04 16/361 |
| 9,965,594 | B2 * | 5/2018 | Portney | G16H 20/13 |
| 2009/0084305 | A1 * | 4/2009 | Song | G09F 11/23 116/308 |
| 2015/0090733 | A1 | 4/2015 | Park | |

* cited by examiner

*Primary Examiner* — Gene O Crawford
*Assistant Examiner* — Ayodeji T Ojofeitimi
(74) *Attorney, Agent, or Firm* — The Dobrusin Law Firm, PC

(57) ABSTRACT

The present invention relates to a disc for use in a delivery device for medication units, such as a pills or tablets or portions thereof, comprising a substantially disc-shaped body, comprising means to be engaged for rotation of the disc at least one opening, spaced from the centre of the disc and preferably near the edge of the disc, for holding at least part of the medication unit wherein the at least one opening for holding at least a part of the medication unit is located at a distance from the contour of the disc-shaped body and is thus enclosed by the substantially disc-shaped body.

13 Claims, 3 Drawing Sheets

DISC FOR A MEDICINE UNIT DELIVERY DEVICE, MEDICINE UNIT DELIVERY DEVICE COMPRISING SUCH DISK, AND METHOD FOR CONFIGURING A MEDICINE UNIT DELIVERY DEVICE

The present invention relates to a disc for a medicine unit delivery device, a medicine unit delivery device comprising such disk, and a method for configuring a medicine unit delivery device.

Medicine unit delivery devices are known in the art, for example from the US patent application US2015090733. This application describes a device for dispensing medicine and dietary doses, wherein the slots for receiving and dispensing the doses can be configured in size, by means of selecting and mounting an appropriate set of discs that are placed at the bottom of a container, also referred to as a canister in the art, for holding the medicine and dietary doses. In order to release a medicine or dietary doses, the disc is rotated with respect to the canister, in order to align a slot for a medicine and dietary doses with a dispensing opening.

Although the above-mentioned device fulfils a certain need, it has several disadvantages too. A first disadvantage is that the medicine and dietary doses tend to jam between the disk and the canister. A second disadvantage is that the steps to configure or reconfigure the device for changing the size or format of the medicine and dietary doses to be dispensed are elaborate and cumbersome, and a further disadvantage is that the number of sizes and formats that can be selected is limited to the number of disks available.

It is a goal of the present invention to take away at least one of the above disadvantages, or at least to provide a useful alternative to the state of the art.

The invention thereto proposes a disc for use in a delivery device for medication units, such as pills or tablets or portions thereof, comprising a substantially disc-shaped body, comprising means to be engaged for rotation of the disc and at least one opening, spaced from the centre of the disc and preferably near the edge of the disc, for holding at least part of the medication unit wherein the at least one opening for holding at least a part of the medication unit is located at a distance from the contour of the disc-shaped body and is thus enclosed by the substantially disc-shaped body. More in particular, the medicine unit may be enclosed by an opening formed by a stack of discs according to the invention, wherein the stack is composed of a number of discs in order to match the medicine units dimensions best. Such opening formed by multiple stacked discs in an aligned manner is referred to as a slot in the following. A disc or an assembly of discs according to the invention may also be referred to as a rotor.

By locating the at least one opening for holding at least a part of the medication unit at a distance from the contour of the disc-shaped body and thus enclosing the opening, jamming of the medication units between the disc and the canister wall or any other part directly surrounding the disk is prevented. State of the art apparatus have the disadvantage that the openings for receiving the medication unit are located at the circumference of the disk. The opening for holding the medicine unit then formed by a stack of discs is closed by a wall part formed by the surrounding. When the disk is rotated relatively with respect to its surrounding, it moves with respect to said latter wall part, and when there is friction between the medicine unit and the wall part, the medicine unit may get stuck between the disc(s) and the wall part formed by the surrounding. Upon further rotation the device may jam, or the medicine unit may break or be crumbled.

In a preferred embodiment, the outer circumference of the disc is round. Although this may in general be considered as an implicit feature of a disc, the feature is in particular indicating that the surface or edge or boundary of the disc being in touch, adherent or adjacent to the surrounding of the disk is smooth, and shaped such top prevent jamming of medicine units. The disc may be designed in such way that part of its circumference adheres to its surrounding, while another part is configured for being driven or the like.

The opening for holding at least a part of the medication unit may be ring segment-shaped, in particular coaxial with the substantially disc-shaped body. The exact form of the opening may be truncated or have rounded edges and thus be essentially disk-segment-shaped.

Since dispensing or releasing a medicine unit takes place by positioning the opening in the disc or in the stack of disks aligned with a dispensing opening or in a dispensing position, and positioning takes place by a rotation of the disc about its centre, there should be means to rotate the disc. These may comprise for instance at least one opening in the disc, in particular a central opening, a serration which may be present along the periphery of the disc or on its surface, or a protrusion, which may also be from the surface or periphery of the disc-shaped body. An opening in the sense of the invention may in general be a through hole, although a cavity is a possible option too.

In a preferred embodiment, the means to be engaged for rotation of the disc comprise a central opening, in particular a round opening, surrounded by a protrusion extending transversely to the direction of the plane of the disc-shaped means, in particular a collar surrounding the opening. The central opening serves to receive the disc-shaped means on a spindle, and to coaxially outline them with each other. The collar then acts as a clamping means and ensures that all discs make the same turn when the spindle (or other rotatable drive means) are rotated.

The disc according to the invention may further comprise locking means for locking the angle of rotation of the disc is with respect to the rotatable means to said rotatable drive means. Since the dispensing takes place by positioning the opening in the disc or the composed slot in the stack of disks with a dispensing opening of the medicine unit delivery device, the exact orientation of the slot needs to be well known in order to dispense the medicine unit. That means an exact rotatable position of the disc with respect to its rotatable driving means, for instance a spindle should be known and be locked.

For this purpose, an opening, in particular a through hole may be located in the disc, which cooperates with a pin for receiving multiple discs that should be aligned in a predetermined rotatable orientation.

The locking means may also comprise a substantially ring segment-shaped opening, located in the disc, which opening completely comprises at least the location of the hole, mirrored point-symmetrically with respect to the centre of the disc. Such opening allows to position two discs on top of each other, such that the holes and ring segment-shaped openings of the respective disc-shaped bodies overlap each other, wherein a ring segment-shaped opening of a first disc comprises a hole of a second disc, in particular wherein each annular segment slot of a disk includes a hole of an adjacent disk. When a stack of rings is thus formed, it is possible to set their mutual annular orientation, and therewith determine the slot size that is formed, by determining the angular position of the round openings.

The invention also relates to an assembly of discs of the above-described type, in particular with a predetermined angular orientation for forming a slot with their respective openings, more in particular such assembly arranged on a spindle, and even more in particular comprising a detachable cap placed on an outermost disc.

The invention also relates to a delivery device for medication units, configured for holding an assembly as described above.

The invention further relates to a configuration device for a disc assembly as described above, comprising a spindle axis and two mutually movable pins for receiving holes and ring segment-shaped openings of the discs, wherein the pins are parallel and mutually movable along an annular track around the spindle axis.

The invention will now be elucidated in more detail with reference to the following figures, wherein.

Figure 1A:
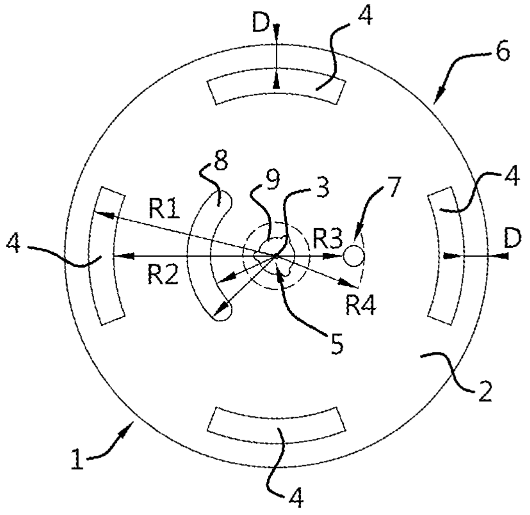
FIG. 1A shows a top view of a disc according to the invention.

FIG. 1 shows a top view of a disc 1 according to the invention, for use in a delivery device for medication units, such as a pills or tablets or portions thereof, comprising a substantially disc-shaped body 2, comprising means 3 to be engaged for rotation of the disc 2, four openings 4, spaced from the centre 5 of the disc and near the edge or contour 6 of the disc, for holding at least part of a medication unit. The at openings 4 for holding at least a part of the medication unit are located at a distance D from the contour 6 of the disc-shaped body 2 and are thus enclosed by the substantially disc-shaped body 2. As visible the outer circumference of the disc 2 is round. The openings 4 for holding at least a part of the medication unit are ring segment-shaped, coaxial with the substantially disc-shaped body, that means that their curved edges have a radius R1, R2 with respect to the centre 5.

The disc 2 further comprises locking means 7, 8 for locking the angle of rotation of the disc is with respect to the rotatable drive means. These drive means generally are the spindle on which the disc 2 is placed with its hole 3. The locking means 7, 8 firstly comprise a hole 7 located in the disc 2 and secondly a substantially ring segment-shaped opening 8, also located in the disc 2, which ring segment-shaped opening 8 completely comprises at least the location of the hole 7, mirrored point-symmetrically with respect to the centre 5 of the disc 2. This is reached by selecting inner radius R3 and outer radius R4 at which the edges of the hole 7 and the segment-shaped opening 8 are located from the centre 5 of the disc 2 to be equal.

Figure 1B:
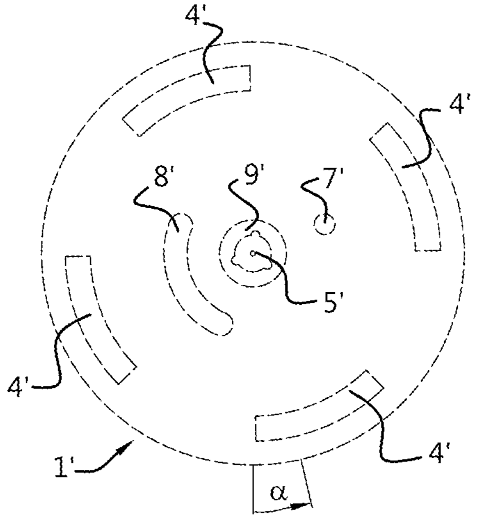
FIG. 1B shows a top view of a disc according to the invention.

FIG. 1B shows the same disc 1 as 1', because it is slightly rotated over an angle alpha with respect to the angular orientation in FIG. 1A. Disc 1' has openings 4'.

Figure 2A:
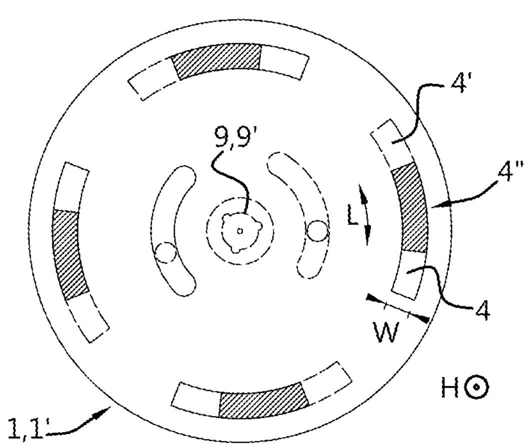
FIG. 2A shows a top view of two stacked discs according to the invention.
Figure 2B:
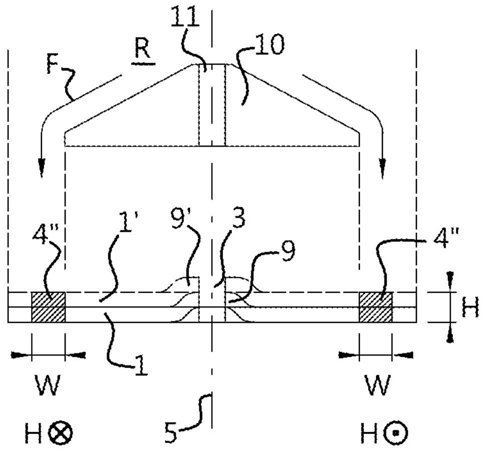
FIG. 2B shows a side view of two stacked discs according to the invention.

FIG. 2A shows a top view of a stack of discs 1 and 1', wherein disc 1' is rotated over a larger angle than angle alpha from FIG. 1B about their common centre 5, 5'. In FIG. 2 it is visible that by stacking mutually rotated discs 1 and 1', a slot 4" is created by the stacked openings 4 and 4'. The mutual angle determines the length L of the slot 4" that is thus created. The width W is determined by the (smallest) width of the openings 4 and 4' of the discs 1 and 1'. The height H of the slot is determined by the thickness of the discs 1 and 1', and the number of discs used. The dimensions L×W×H are selected to essentially match the medicine unit that should be dispensed and at least to prevent that two units are dispensed at the same time. As visible in FIGS. 1A, 1B, 2A and 2B, means to be engaged for rotation of the disc comprise a central opening 3. Also shown is a cap 10 that is (to be) mounted on top of the discs 1, 1', to guide medicine units in a reservoir R in the direction F toward the slots 4".

Figure 3:
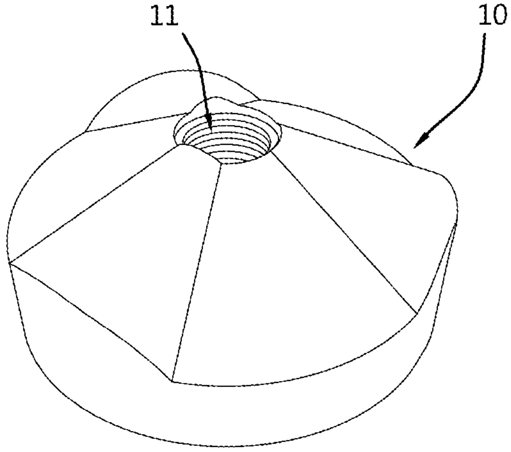
FIG. 3 shows a perspective view of a cap for the discs according to the invention.

FIG. 3 shows a perspective view of said cap 10 comprising a (threaded) hole 11 for receiving a spindle.

Figure 4:
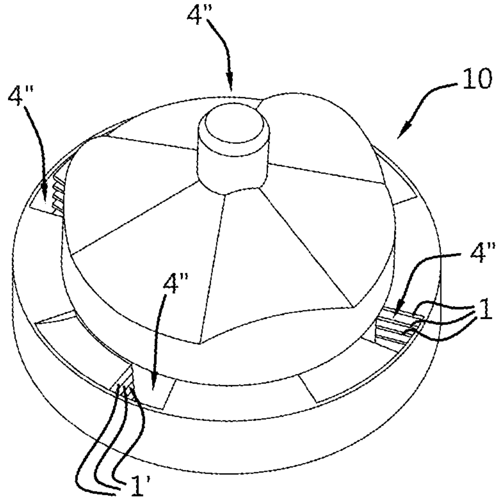
FIG. 4 shows an assembly of discs a cap 10.

FIG. 4 shows an assembly of discs 1, 1' and a cap 10, having slots 4".

Figure 5:
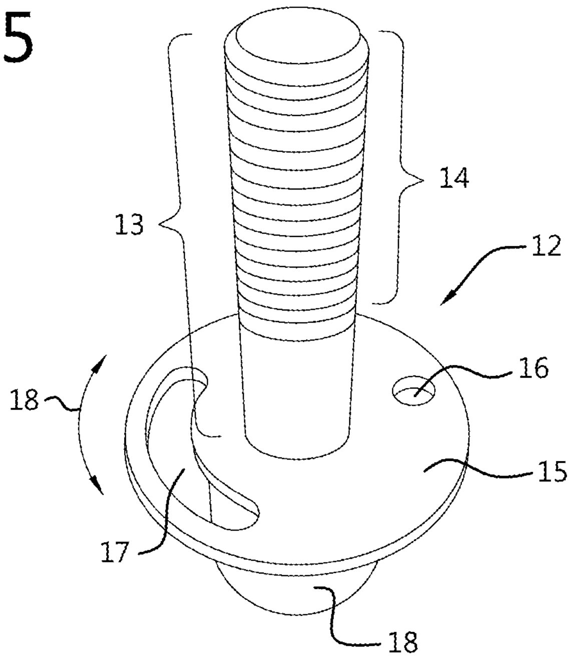
FIG. 5 shows a spindle for receiving and driving the discs and cap from FIG. 4.

FIG. 5 shows a spindle 12 for receiving and driving the discs and cap according to the invention, in particular those from FIG. 4. The spindle 13 comprises a central shaft, to receive the central openings 13 of discs (1, 1') (not depicted). The shaft is provided with a thread 14, matching the inner thread 11 of the cap 10. To assemble the rotating part of the delivery device, a number of discs 1, 1' with a common height that matches the height of the medicine unit to be dispensed is placed on the support surface 15 of the spindle 12. A first pin is inserted through hole 16 of the spindle 12 and through the first opening 7 of the disc(s) 1 and through the second openings 8' of the disc(s) 1'. A second pin is inserted through the ring-segment-shaped opening 17 of the spindle and through the second openings 8 of the disc(s) 1, and through the first openings (7') of the disc(s) 1. By moving the second pin in the direction of arrow 18, the mutual angle between disc(s) 1 and disc(s) 1' can be influenced. Once the correct angle is set, and the slot formed by the openings of discs 1 and 1' matches the size of the medicine unit to be dispensed, the cap 10 can be screwed onto the spindle 12, which fixes the discs 1, 1' onto the spindle. The spindle and the discs can then be rotated together by rotating a gripping area 18 of the spindle.

Figure 6:
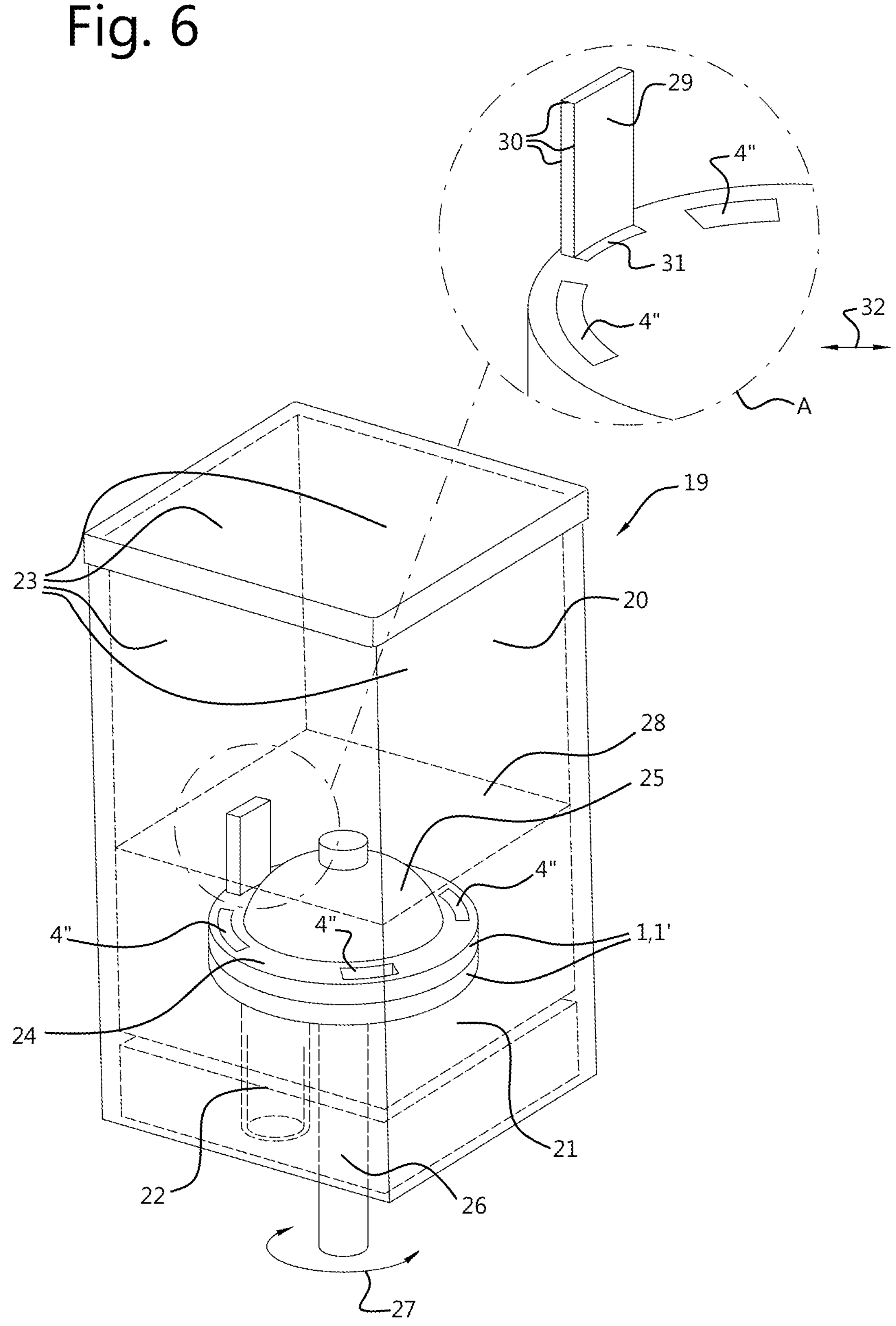
FIG. 6 shows a delivery device for medication units according to the invention.

FIG. 6 shows a delivery device 19 for medication units according to the invention, comprising a container 20 for medication units, having a bottom wall 21 with a dispensing opening 22 and four walls 23 adjacent to the bottom wall 21 and together with the bottom wall 21 defining a reservoir for the medicine units, wherein an assembly 24 comprising discs 1, 1', a cap 25 and a spindle 26 are coupled rotatably to the bottom wall 21, and wherein the slots 4" of the assembly are alignable with the dispensing opening 22 by rotation of the assembly in the direction of arrow 27. The container 20 further comprises a guide 28, extending from the side walls 23 toward the contour of the discs 1, 1' of the assembly, to end form fittingly at said contour and therewith to guide the medicine units toward the (upper disc of) the assembly.

To ensure that all medicine units are pushed into the slots 4", a spring element 29 (shown in detail in outtake A may be present. The spring element comprises a spring plate 31, suspended by a parallelogram construction composed of branches 30. The parallelogram construction ensures that the spring plate remains parallel to the surface of the disc(s) and thus prevents jamming of the discs and of medicine units when they are pushed toward the slots 4"" and also makes it easier for the medication units to push away the spring in outside direction if the medication unit is not fully inserted into the pocket. The spring can be inserted in multiple ways, having different depths to the centre of the disc.

The invention claimed is:

1. Disc for use in a delivery device for medication units, such as a pills or tablets or portions thereof, comprising:

A substantially disc-shaped body, comprising:

means to be engaged for rotation of the disc;

at least one opening, spaced from the centre of the disc and near the edge of the disc, for holding at least part of the medication unit; and locking means for locking the angle of rotation of the disc with respect to the rotatable drive means;

wherein in that the at least one opening for holding at least a part of the medication unit is located at a distance from the contour of the disc-shaped body and is thus enclosed by the substantially disc-shaped body.

2. Disc according to claim 1, wherein the outer circumference of the disc is round.

3. Disc according to claim 1, wherein the opening for holding at least a part of the medication unit is ring segment-shaped, in particular coaxial with the substantially disc-shaped body.

4. Disc according to claim 1, wherein means to be engaged for rotation of the disc comprise one or more means selected from the group of:

At least one opening in the disc, in particular a central opening;

A serration;

A cantilever from the face or periphery of the disc-shaped body.

5. Disc according to claim 4, wherein the means to be engaged for rotation of the disc comprise a central opening, in particular a round opening, surrounded by a protrusion extending transversely to the direction of the plane of the disc-shaped means, in particular a collar surrounding the opening.

6. Disc according to claim 1, wherein the locking means comprises a hole located in the disc.

7. Disc according to claim 6, wherein the locking means also comprise a substantially ring segment-shaped opening, located in the disc, which segment-shaped opening completely comprises at least the location of the hole, mirrored point-symmetrically with respect to the centre of the disc.

8. Assembly of at least two discs according to claim 7, placed on top of each other such that the holes and ring segment-shaped openings of the respective disc-shaped bodies overlap each other, wherein a ring segment-shaped opening of a first disc comprises a hole of a second disc, in particular wherein each ring segment-shaped opening of a disc includes a hole of an adjacent disk.

9. Assembly according to claim 8, placed on a common central shaft or a spindle.

10. Assembly according to claim 8, comprising a detachable cap placed on an outermost disc.

11. Delivery device for medication units, configured for holding an assembly according to claim 9.

12. Delivery device according to claim 11, comprising:

a container for medication units, having a bottom wall with a dispensing opening;

one or more walls adjacent to the bottom wall and together with the bottom wall defining a reservoir for the medicine units;

wherein the assembly is coupled rotatably to the bottom wall, and wherein slots of the assembly are alignable with the dispensing opening by rotation of the assembly;

the container further comprising:

a guide, extending from the at least one side wall toward the contour of the discs of the assembly, to end form fittingly at said contour.

13. Delivery device according to claim 12, comprising a spring element comprising a spring plate parallel to the surface of the disc(s), suspended by a parallelogram construction composed of branches, for preventing jamming of the discs and of medicine units when they are pushed toward the slots.

* * * * *